D. J. MACPHERSON,

Assignor of one-half to J. B. YOUNG.

AUTOMATIC CAR BRAKE.

No. 10,473. Reissued Apr. 29, 1884.

Witnesses.

Louis H. Gardner

J. W. Garner

Inventor.

D. J. Macpherson per

F. A. Lehmann, atty.

N. PETERS, Photo-Lithographer, Washington, D. C.

UNITED STATES PATENT OFFICE.

DAVID J. MACPHERSON, OF SIOUX FALLS, DAKOTA TERRITORY, ASSIGNOR OF ONE-HALF TO J. B. YOUNG, OF SAME PLACE.

AUTOMATIC CAR-BRAKE.

SPECIFICATION forming part of Reissued Letters Patent No. 10,473, dated April 29, 1884.

Original No. 288,461, dated November 13, 1883. Application for reissue filed March 13, 1884.

*To all whom it may concern:*

Be it known that I, DAVID J. MACPHERSON, a citizen of the United States, residing at Sioux Falls, in the county of Minnehaha and Territory of Dakota, have invented certain new and useful Improvements in Automatic Car-Brakes, of which the following is a specification, reference being had therein to the accompanying drawings.

My invention relates to an improvement in automatic car-brakes, which is intended as an improvement upon Patent No. 241,510, issued May 17, 1881; and it consists in the combination of a draw-head having a flange or shoulder formed upon its rear end, with one or more bars which are provided with shoulders or flanges to engage with the shoulder or flange upon the draw-head, for the purpose of operating the brakes, whether the car is being pushed or drawn forward by the locomotive.

It further consists in the combination of the draw-head provided with the shoulder or flange, one or more pivoted bars provided with a suitable shoulder to engage with the flange upon the draw-head, and suitable pivoted levers which catch under the same cross bar or pin for the purpose of applying the brakes to the wheels.

It still further consists in the arrangement and combination of devices, which will be more fully described hereinafter.

The object of my invention is to so construct the operating mechanism that is connected to the brake that it will operate, when desired to stop the cars when they are being pushed ahead of the engine, as well as when they are being drawn after it.

Figure 1:
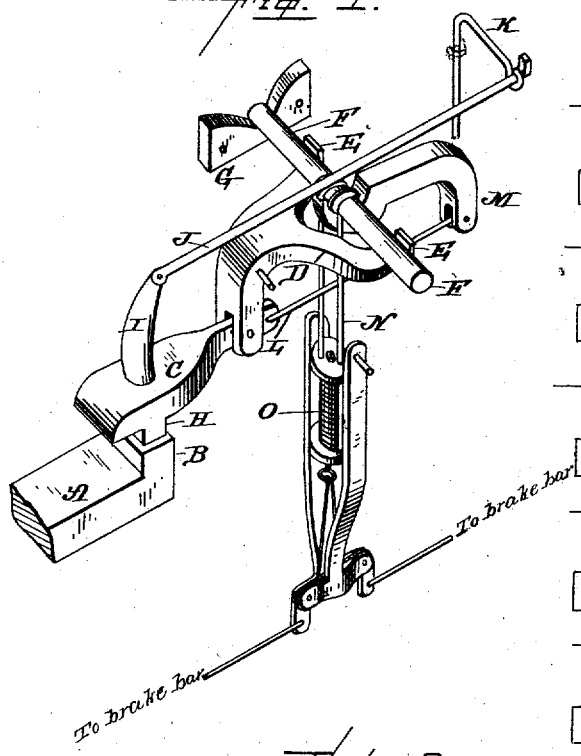
Figure 2:
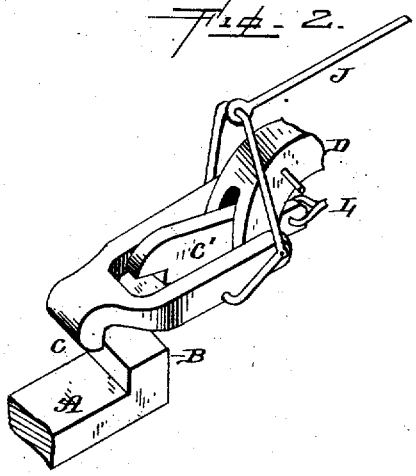
Figure 8:
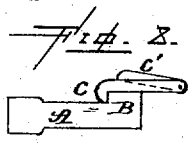

Figure 1 is a perspective of one form of my invention. Fig. 2 is a perspective of a modification of the same. Figs. 3, 4, 5, 6, 7, 8 are detail views, showing the different positions the pivoted bars assume while in use.

So far as the application of the brakes, sliding disk, the weights, and the levers connected with the disk are concerned, my invention does not differ from what is shown and described in the patent above referred to, and no mention or description of these parts will be made further than in a general way.

A represents the draw-head, which will be of any desired construction, and which has the flange or shoulder B formed on its rear upper corner for the purpose of engaging with the pivoted lever or levers C C′. This lever C, or levers C C′, are pivoted in or upon a second lever, D, which is curved, as shown, and which has its upper end made pronged, as shown, and which pronged ends E are curved upward, as shown, so as to catch under a rod or cross-bar, F, which is supported in suitable bearings, G, one of which will be placed at each end and secured to the frame-work of the car. Upon the under side of each of these levers C C′ is formed a suitable shoulder, lug, or projection, H, which is intended to engage with the flange or shoulder B, formed upon the rear end of the draw-head A.

Where only one lever C is used, it has a prong or projection, I, extended above its top, and secured to this prong or projection I is a suitable connecting-rod, J, which is secured at its rear end to a crank-lever, K, by means of which the lever C is raised and lowered by the action of the governor-balls on the sliding disk.

To the rear end of the lever C is connected a second connecting-rod, L, which has its rear end loosely connected to the lower end of the pivoted lever M. This lever M corresponds in shape to the one D, and has its front end attached under the rod or cross-bar F in a similar manner.

Figure 3:
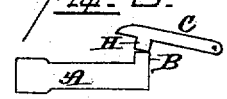
Figure 4:
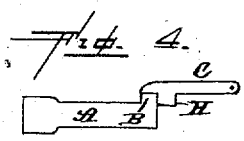
Figure 5:
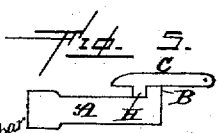
Figure 6:
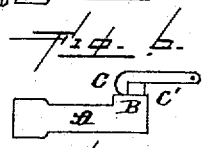

To the cross-bar F are connected the rods N, which have their lower ends connected to the mechanism for applying the pressure to the brakes when the train is at rest, or moving less than four miles an hour, or the speed to which it is adjusted per hour. The lever C is held up by the contraction of the governor-ball, as shown in Fig. 3, and cannot engage the draw-bar; but when the train is being moved more than the regulation speed, the governor-balls are thrown out, and by means of the crank-lever K and lever J, attached to the projection I, the lever C is dropped, and if the train is being pulled by the engine the draw-bar is pulled out, and the lever C will fall with its shoulder H behind the shoulder B of the draw-bar, as shown in Fig. 4; but if the train is being pushed the draw-bar A is shoved in, and the lever C falls with its shoulder H in front of the shoulder B on the draw-bar A, as shown in Fig. 5.

From the above positions the operation of the brake will be as follows: When the locomotive is drawing the train at speed, the lever C is, as above stated, in the position shown in Fig. 4, and when the forward motion of the locomotive is checked the cars crowd against it, and the draw-bar A is shoved in and engages the lever C, which presses back the curved lever D, and this raises the cross-bar F and its connecting-rods N, by means of which the brakes are applied, as in Patent No. 241,510, and if the train is being pushed at speed ahead of the engine the lever C assumes the position shown in Fig. 5, as before explained, and when the locomotive is checked the cars shoot out from the engine and the draw-bar A is pulled outward, and its shoulder B engages the shoulder of the lever C, which, by means of the connecting-rod L, draws the lower arm of the curved lever M, and this raises the cross-bar F, and so the brakes are set as before.

Figure 7:
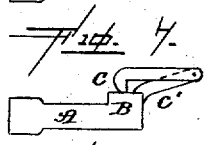

When it is desired to use only a single lever, C, the lug or projection H will be placed as shown in Fig. 1, and then is adapted to catch either in front or behind the flange of the draw-head. Should it be so preferred, two levers, C C′, will be used, as shown in Fig. 2, in which case they will both be pivoted upon the lever D, and one will be adapted for catching in front of the flange B upon the draw-head, while the lever C will catch only behind the flange or shoulder. The width of this flange or shoulder upon the draw-head will be greater than the distance between the shoulders formed upon the two levers C C′, so that when no pull or pressure is exerted upon the draw-head the two levers C C′ will assume the position shown in Fig. 6. When the cars are being pushed at speed ahead of the locomotive these two levers will assume the position shown in Fig. 8, in which position the lever C′ is shown as resting upon the top of the flange, while the lever C is catching in front of it. When the locomotive is drawing the cars forward at speed the lever C′ catches behind the flange, as shown in Fig. 7, while the lever C rests upon its top. When the two levers C C′ are used, the connecting-rod J will be attached, as shown in Fig. 2.

I do not limit myself to the use of either one or two levers C C′, for, as shown, either one or both may be used.

I am aware that a flange has been formed upon the under side of the lever C for the purpose of having a draw-bar to strike against it; but in that case the lever and draw-bar are adapted to engage in one direction only. My invention differs from this in having a double-faced flange on lever and draw-bar, which engages with both faces alike, and thus operates the brake when the car is moved in either direction.

Having thus described my invention, I claim—

1. In an automatic car-brake, the combination of a lever or levers provided with suitable lugs or shoulders upon their outer free ends, with the draw-head A, having a double-faced flange, B, formed upon its rear end, and against which the flange or shoulder upon the lever engages when the car is moved in either direction, substantially as shown.

2. In an automatic car-brake, the combination of the draw-head having the flange or shoulder upon it, the lever or levers provided with lugs or shoulders, a pivoted lever or levers, D, a cross-bar, F, and a mechanism connected to the cross-bar for removing and applying the pressure of the brakes to the wheels, substantially as described.

3. In an automatic car-brake, the combination of the draw-head provided with a flange, a pivoted lever provided with a lug or shoulder, and the pivoted levers D M, cross-bar F, and a mechanism for applying and removing the pressure of the brakes, substantially as set forth.

4. In an automatic car-brake, the combination of the draw-head provided with a flange, B, a pivoted lever, C, provided with a lug or shoulder, H, the levers D M, connecting-rod L, the projection I, connecting-rod J, and a crank-lever, K, the parts being combined and arranged to operate substantially as shown and described.

In testimony whereof I affix my signature in presence of two witnesses.

DAVID J. MACPHERSON.

Witnesses:
J. W. GARNER,
A. S. PATTISON.